United States Patent
Vilgelm et al.

(10) Patent No.: US 11,588,751 B2
(45) Date of Patent: Feb. 21, 2023

(54) COMBINED NETWORK AND COMPUTATION SLICING FOR LATENCY CRITICAL EDGE COMPUTING APPLICATIONS

(71) Applicant: Apple Inc., Cupertino, CA (US)

(72) Inventors: Mikhail Vilgelm, Munich (DE); Babar Qaisrani, Issaquah, WA (US); Biljana Badic, Munich (DE); Christian Drewes, Germering (DE); Krisztian Kiss, Hayward, CA (US); Matthias Sauer, Campbell, CA (US); Vijay Venkataraman, San Jose, CA (US); Ralph Hasholzner, Munich (DE); Robert Zaus, Munich (DE); Teck Yang Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/210,306

(22) Filed: Mar. 23, 2021

(65) Prior Publication Data
US 2021/0306281 A1    Sep. 30, 2021

Related U.S. Application Data

(60) Provisional application No. 62/993,785, filed on Mar. 24, 2020.

(51) Int. Cl.
| | | |
|---|---|---|
| *G06F 15/173* | (2006.01) | |
| *H04L 47/80* | (2022.01) | |
| *H04L 47/78* | (2022.01) | |
| *H04L 47/762* | (2022.01) | |

(52) U.S. Cl.
CPC .......... *H04L 47/805* (2013.01); *H04L 47/762* (2013.01); *H04L 47/781* (2013.01)

(58) Field of Classification Search
CPC .... H04L 47/762; H04L 47/781; H04L 47/805
See application file for complete search history.

(56) References Cited

U.S. PATENT DOCUMENTS

| | | | | |
|---|---|---|---|---|
| 2017/0104688 A1* | 4/2017 | Mirahsan | .......... | H04W 28/0289 |
| 2018/0077023 A1* | 3/2018 | Zhang | ................ | H04L 41/5003 |

(Continued)

FOREIGN PATENT DOCUMENTS

| | | |
|---|---|---|
| WO | 2020182289 | 9/2020 |
| WO | 2020185794 | 9/2020 |
| WO | 2020226979 A2 | 11/2020 |

*Primary Examiner* — Yves Dalencourt
(74) *Attorney, Agent, or Firm* — Kowert, Hood, Munyon, Rankin & Goetzel, P.C.

(57) ABSTRACT

Methods and devices for creating and operating a combined network and computational slice instance (NCSI) in a Multi-access Edge Computing (MEC) scenario. Communication and computational resources may be reserved by a NCSI controller for the NCSI. The communication resources may include network slices and the computational resources may include MEC computational resources of one or more MEC servers. The reserved resources may be selected based on quality of service (QoS) requirements of UEs that will utilize the NCSI. During operation, reserved resources for the NCSI may be dynamically renegotiated based on an aggregate load of the NCSI, the QoS of data traffic, and/or updated QoS requirements of the UEs.

20 Claims, 13 Drawing Sheets

(56) References Cited

U.S. PATENT DOCUMENTS

| | | | |
|---|---|---|---|
| 2019/0149998 A1* | 5/2019 | Yang | H04L 41/0896 370/328 |
| 2019/0223055 A1* | 7/2019 | Bor Yaliniz | H04W 28/26 |
| 2020/0302431 A1* | 9/2020 | Polehn | H04L 9/3239 |
| 2021/0058936 A1 | 2/2021 | Gordaychik | |

* cited by examiner

| Information Element | Status | Description |
|---|---|---|
| Default EAS ID | M | The default EAS for the Application Client |
| Application Client Type | M | The category or type of Application Client (e.g., V2X) |
| ECSP Filter | O | The identity of Edge Computing Service Provider(s) that the EEC is willing to connect to. If this field is present, the ECS may filter its response based on this preference. |
| Application Client Schedule | O | The expected operation schedule of the Application Client (e.g., time windows) |
| Application Client Service Area | O | The expected location(s) (e.g., route) of the hosting UE during the Application Client's operation schedule. This geographic information can express a geographic point, polygon, route, signaling map, or waypoint set. |
| Application Client Service KPIs | O | KPIs required in order for Application Clients to receive services from the EAS, as described in Table 8.2.3-1. |
| Service continuity support | O | Indicates if service continuity support is required or not for the application. |
| Application Client Mobility | O | The expected velocity class of the UE during the Application Client's operation schedule (e.g., 'stationary', 'nomadic'/'pedestrian', 'vehicular', 'high-speed train', etc.) |
| Priority | O | Allocation and retention priority enabling the server to perform prioritization between different requests from the same UE and between requests from different UEs. |

FIG. 12

Table 8.2.3-1: Application Client Service KPI

| Information Element | Status | Description |
| --- | --- | --- |
| Connection Bandwidth | O | The required connection bandwidth in Kbit/s for the application. |
| Service Continuity Support | O | Indicates if service continuity support is required or not for the application. |
| Maximum Request Rate | O | The maximum request rate to be generated by the Application Client. |
| Response Time | O | Maximum response time (see NOTE below) required for the server servicing the requests. |
| Availability | O | Minimum percentage of time the server is required to be available for the Application Client. |
| Compute | O | The maximum compute resources required by the Application Client. |
| Graphical Compute | O | The maximum graphical compute resources required by the Application Client. |
| Memory | O | The maximum memory resources required by the Application Client. |
| Storage | O | The maximum storage resources required for Application Clients |
| Application Client Type-Specific Information | O | Information specific to each Application Client type e.g. video, VR, etc. |
| NOTE: The response time includes the round-trip delay time of the request and response packet, the processing time at the server and the time required by the server to consume 3GPP Core Network capabilities, if any. | | |

FIG. 13

Table 8.2.5-1: Edge Application Server Service KPIs

| Information Element | Status | Description |
| --- | --- | --- |
| Maximum Request Rate | O | Maximum request rate from Application Clients supported. |
| Estimated Maximum Response time with percentile | O | The estimated maximum response time advertised for Application Clients' service requests.<br><br>This response time only includes the processing time at the server and the time required by the server to consume 3GPP Core Network capabilities, if any.<br><br>The percentile gives the percentage of requests for which the estimated maximum response time is valid. |
| Availabilty | O | Advertised percentage of time the server is available Application Clients' use. |
| Available Compute | O | The maximum compute resource available for Application Clients |
| Available Graphical Compute | O | The maximum graphical compute resource available for Application Clients |
| Available Memory | O | The maximum memory resource available for Application Clients |
| Available Storage | O | The maximum memory resource available for Application Clients |
| Estimated Maximum Round-trip Delay with percentile | O | The estimated maximum round-trip delay time of a request and response packet between the server and any RAN node within the EAS service area.<br><br>The percentile give the percentage of packet round-trips for which the estimated maximum round-trip delay time is valid for any RAN node within the EAS service area |

FIG. 14

COMBINED NETWORK AND COMPUTATION SLICING FOR LATENCY CRITICAL EDGE COMPUTING APPLICATIONS

PRIORITY CLAIM

This application claims priority to U.S. Provisional Patent Application No. 62/993,785, titled "Combined Network and Computation Slicing for Latency Critical Edge Computing Applications" and filed on Mar. 24, 2020, which is hereby incorporated by reference in its entirety, as though fully and completely set forth herein.

FIELD OF THE INVENTION

The present application relates to wireless devices, and more particularly to a system and method for generalized network and computation slicing for latency critical edge computing applications in a cellular network system.

DESCRIPTION OF THE RELATED ART

Wireless communication systems have rapidly grown in usage. In recent years, wireless devices such as smart phones and tablet computers have become increasingly sophisticated. Mobile devices (i.e., user equipment devices or UEs) support telephone calls as well as provide access to the Internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 5G NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

Despite the rapid technological evolution of mobile user equipment (UEs), computationally demanding applications on a smartphone or tablet are still constrained by limited battery capacity, thermal limits and device cost considerations. To overcome this problem, computationally complex processing can be offloaded to centralized servers, i.e., to the cloud. For example, Mobile Cloud Computing (MCC) refers to servers that provide cloud computing resources for mobile users. However, the use of MCC introduces significant communication delay. Such a delay is inconvenient and may result in computational offloading being unsuitable for real-time applications.

To solve this problem, the cloud service has been physically moved closer to users, i.e., toward the "edge" of the network. The concept of Multi-access Edge Computing (MEC), also referred to as "Mobile Edge Computing" or simply "Edge Computing", refers to an evolution of cloud computing that brings application hosting from centralized data centers down to the "network edge", i.e., physically closer to consumers and the data generated by applications. Edge computing is acknowledged as one of the key components for meeting the performance demands of modern cellular networks, such as 5G networks, especially with respect to reducing latency and improving bandwidth efficiency.

However, improvements in the field are desired.

SUMMARY OF THE INVENTION

Embodiments are presented herein of apparatuses, systems, and methods for creation and operation of a network and computational slicing instance (NCSI).

According to the techniques described herein, a NCSI controller, which may be a network element and/or a computer system, may receive an NCSI request to establish a NCSI for a user equipment device (UE), where the NCSI comprises a reservation of a first network slice and a reservation of a first set of Multi-access Edge Computing (MEC) resources. The NCSI request may include a quality of service (QoS) requirement for the NCSI. The QoS requirement may include one or more key performance indicators (KPIs) for both the communication layer and computational layer of the NCSI. The NCSI controller may receive MEC capability information of one or more MEC servers.

The NCSI controller may transmit a resource reservation request to an Edge Computing Control Function (ECCF) to reserve the first set of MEC computational resources for the NCSI, and may transmit a network slice request to a network to reserve the first network slice for the NCSI.

In some embodiments, the NCSI controller may be further configured to dynamically operate the NCSI. For example, the NCSI controller may monitor one or more operational parameters of the NCSI, where the one or more operational parameters of the NCSI include one or more of an aggregate load of the NCSI, a quality of service (QoS) of data traffic for one or more user equipment devices (UEs) operating within the NCSI, and a QoS requirement for each of the one or more UEs operating within the NCSI.

In some embodiments, the NCSI controller may renegotiate one or both of the reservation of the first network slice and the reservation of the first set of MEC computational resources based at least in part on monitoring the one or more operational parameters.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

FIGS. 12-14 are tables illustrating modifications of information elements for an application client service, according to some embodiments.

Figure 1:
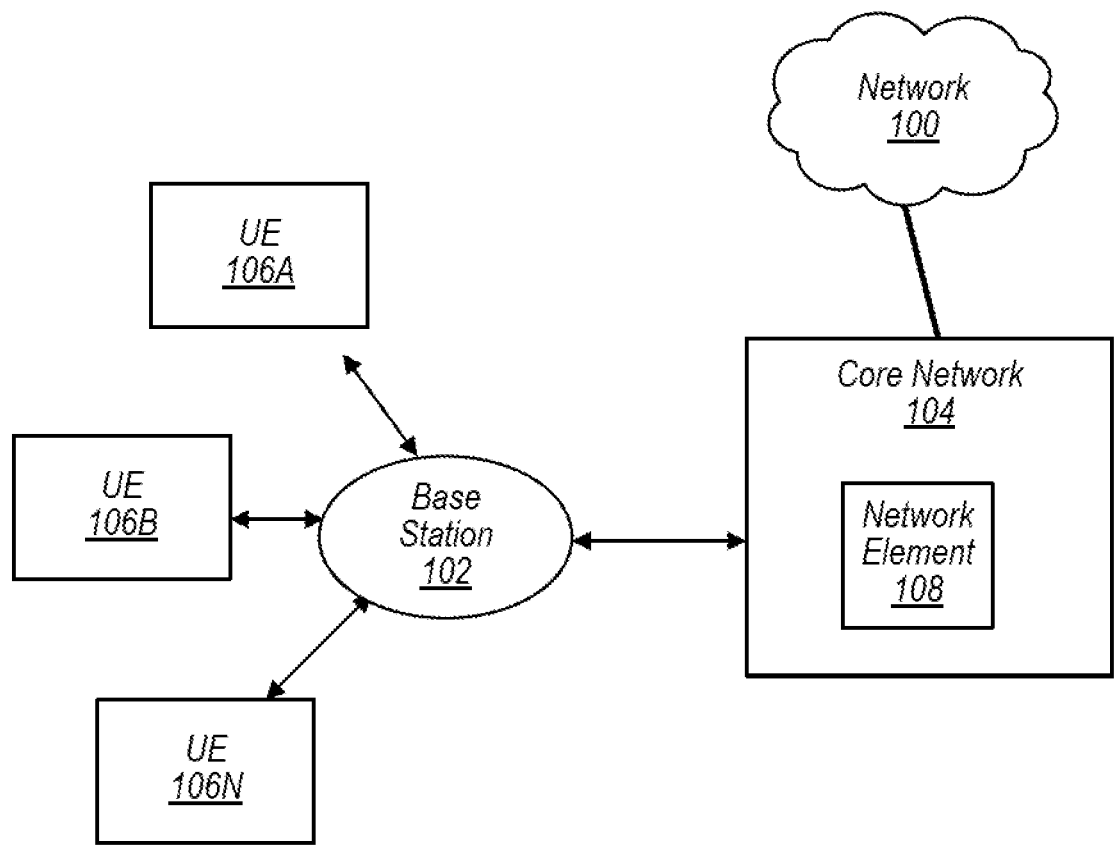
FIG. 1 illustrates an example (and simplified) wireless communication system according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

Various acronyms are used throughout the present disclosure. Definitions of the most prominently used acronyms that may appear throughout the present disclosure are provided below:

UE: User Equipment
RF: Radio Frequency
BS: Base Station
DL: Downlink
UL: Uplink
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
MCC: Mobile Cloud Computing
MEC: Mobile Edge Computing (or Multi-access Edge Computing)
SDU: Service Discovery Unit
APU: Application Profile Unit
SPU: System Profile Unit
DLU: Decision Logic Unit
XR: Extended Reality
IE: Information Element
AF: Application Function
UPF: User Plane Function
PCF: Policy Control Function
NEF: Network Exposure Function
LADN: Local Area Data Network
URSP: User Route Selection Policies
PUSCH: Physical Uplink Shared Channel
PDCCH: Physical Downlink Control Channel

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, vehicles, automobiles, unmanned aerial vehicles (e.g., drones) and unmanned aerial controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
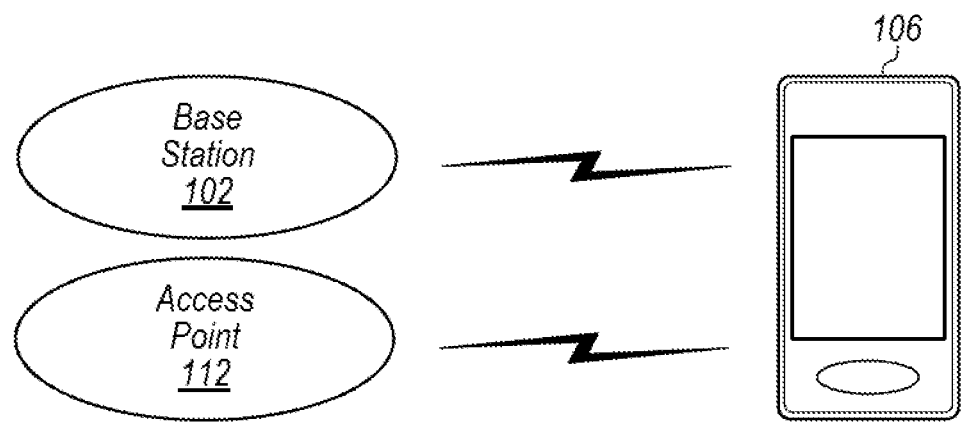
FIG. 2 illustrates an example of a base station (BS) and an access point in communication with a user equipment (UE) device according to some embodiments.

FIGS. 1 and 2—Exemplary Communication System

FIG. 1 illustrates a simplified example wireless communication system in which aspects of this disclosure may be implemented, according to some embodiments. It is noted that the system of FIG. 1 is merely one example of a possible system, and embodiments may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices. The UE devices are examples of wireless devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'.

The communication area (or coverage area) of the base station may be referred to as a "cell." The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

The base station 102 may also be equipped to communicate with a network 100 through a core network 104 (e.g., the core network may be a core network of a cellular service provider, and the network 100 may be a telecommunication network such as a public switched telephone network (PSTN), and/or the Internet, among various possibilities). Thus, the base station 102 may facilitate communication among the user devices and/or between the user devices and the network 100. In particular, the cellular base station 102 may provide UEs 106 with various telecommunication capabilities, such as voice, SMS and/or data services.

The core network 104 may contain one or more network elements 108 that assist in providing services according to embodiments described herein. For example, the network elements within the core network may include a network operation (NO) provisioning system that serves as a network and computational slice instance (NCSI) controller, or another type of network element may serve as a NCSI controller. Alternatively, the NCSI controller may be a computer system or server located in the network 100, such as a service provider (SP) server, among other possibilities.

As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Base station 102 and other similar base stations operating according to the same or a different cellular communication standard may be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor (processing element) that is configured to execute program instructions stored in memory. The UE 106 may perform any of the embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the embodiments described herein, or any portion of any of the embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
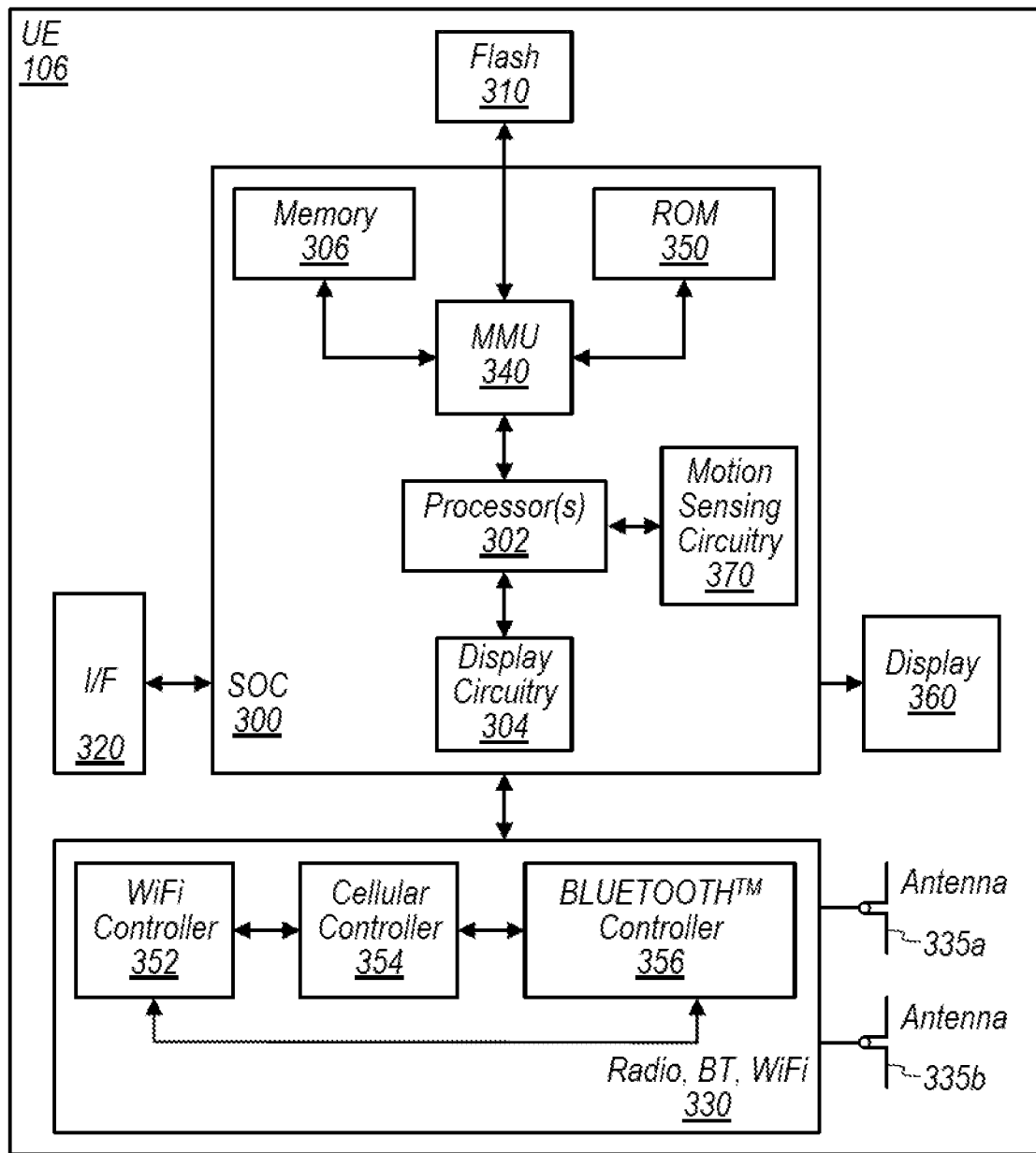
FIG. 3 illustrates an example block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform concurrent generation of multiple codebooks for CSI reporting such as described further subsequently herein. The processor(s) 302 of the UE device 106 may be configured to implement part or all of the methods or operations described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Figure 4:
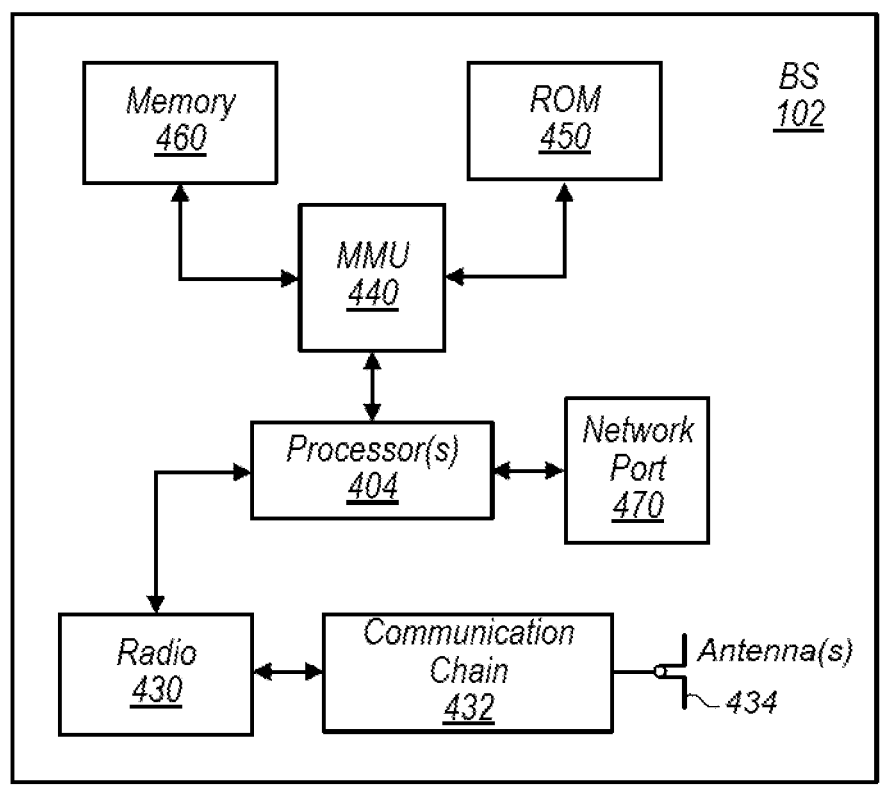
FIG. 4 illustrates an example block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 5:
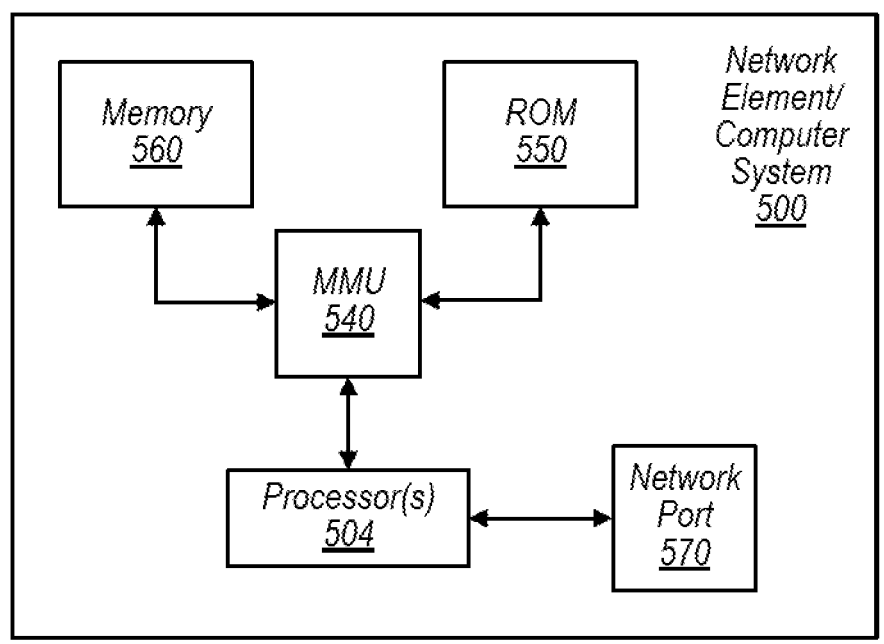
FIG. 5 illustrates an example block diagram of a network element or computer system, according to some embodiments.

FIG. 5—Block Diagram of an Exemplary Network Element or Computer System

FIG. 5 illustrates a block diagram of an exemplary network element (NE) or computer system (CS) 500, according to some embodiments. The NE/CS may serve as an NCSI controller to create and operate one or more NCSIs for a plurality of UEs. It is noted that the NE/CS is merely one example of a possible NE or CS. As shown, the NE/CS may include processor(s) 504 which may execute program instructions for the NE/CS. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The NE/CS may include at least one network port 570. The network port 570 may be configured to couple to a telephone network and provide a plurality of devices, such as UE devices 106, access to the telephone network as described above in FIGS. 1 and 2. The network port 570 (or an additional network port) may also or alternatively be configured to couple to a cellular network, e.g., a core network of a cellular service provider. The core network may provide mobility related services and/or other services to a plurality of devices, such as UE devices 106.

The processor 504 of the NE/CS may be configured to implement and/or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Communications with Multiple Network Slices

For communications utilizing some modern radio access technologies (RATs) such as 5G NR, cellular networks may be configured to support one or more different types of network slices for different types of communications. For example, different network slices may be established in 5G NR to provide enhanced mobile broadband (eMBB), ultra-reliable low-latency communications (URLLC), and/or massive machine type communications (mMTC). More generally, different network slices may be associated with different data behavior, bandwidth requirements, and/or quality of service (QoS) requirements, among other possibilities. In these scenarios, network slice identity management may be performed using network slice selection assistance information (NSSAI), where each NSSAI may include one or more single NSSAIs (S-NSSAIs). Each S-NSSAI may have a S-NSSAI value that includes a set of bits to identify a service type of the slice and/or to differentiate between multiple network slices with the same service type.

Multi-Access Edge Computing

Modern cellular phones are being asked to perform increasingly complex applications. In general, users prefer the use of smartphones (UEs) due to their portability and ease of use. However, being portable or mobile devices, UEs such as smartphones are battery-powered and have a small size relative to non-portable devices such as desktop computers. Thus, UE devices have various hardware limitations, such as battery life, power, processing ability and memory capacity. In order to reduce the load of applications running on UE devices, and also to provide for more efficient use of UE resources, efforts have been made to offload the computational requirements of the UE to another computing resource. As mentioned above, the term "Mobile Cloud Computing" (MCC) refers to the use of cloud servers to perform computational tasks that may otherwise be performed by a UE. However, as described above, the use of cloud servers that are physically remotely located from the UEs they are attempting to assist (the UEs from which they are attempting to offload tasks) may introduce communication delays that make such cloud servers unsuitable for real time applications.

Multi-access Edge Computing (MEC) provides an information technology (IT) service environment and cloud computing capabilities at the edge of the mobile network, within the Radio Access Network (RAN) and in close physical proximity to mobile subscribers. In other words, MEC operates to locate mobile cloud computing (MCC) services closer to mobile users (closer to the "edge" of the network) to reduce communication delays. Specific user requests may thus be managed directly at the network edge, instead of forwarding all traffic to remote Internet services. MEC promises significant reduction in latency and mobile energy consumption while delivering highly reliable and sophisticated services.

In a MEC system, a processing task from a UE may be offloaded to a nearby MEC host (e.g., one or more MEC servers) via the cellular network. The MEC host may perform the data gathering, processing and returning of the results of computationally intensive tasks, and as such can cover a broad spectrum of use cases and applications. The MEC host may then return the resultant data from the processing task back to the application running on the UE.

Two key MEC operational phases may be referred to as the control phase (control plane) and the operation phase (data plane). The control phase (control plane) may include the auxiliary procedures for initiation, connection, maintenance and termination of MEC operation. The control plane decides what, when, where, and how to offload tasks correctly to the MEC servers. The operation phase (data plane) handles the routing of data to/from the edge cloud.

The control phase poses significant challenges in the design of MEC based systems, since it requires reliable signalling between users, networks and the MEC host. Due to the dynamic nature of cellular networks, the signaling may leverage and integrate aspects from both wireless communication and mobile computing together.

Embodiments described herein provide combined network and computation slicing mechanisms and procedures for latency critical edge computing applications in MEC based cellular (e.g., 3GPP) systems. Embodiments are described herein in the context of cellular systems (e.g., 3GPP-based systems). However, the embodiments described herein may be readily extended to non-cellular (non-3GPP-based) systems.

Figure 6:
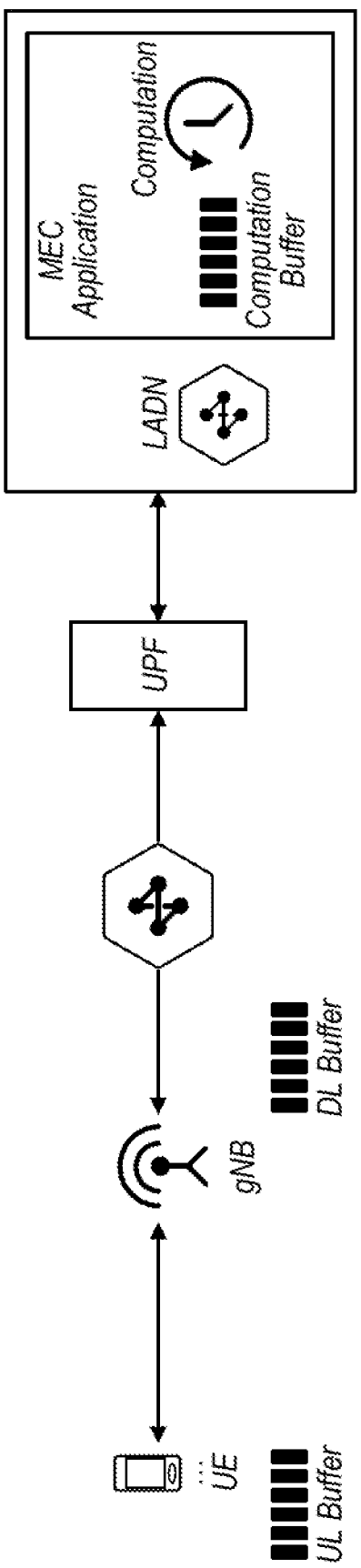
FIG. 6 illustrates an example cellular network system including mobile edge computing, according to the prior art.

FIG. 6—MEC Operation in 5G

FIG. 6 is a block diagram illustrating a typical MEC implementation in a current 5G network. As shown, the UE communicates in a wireless fashion with a base station, referred to as gNB. The base station in turn communicates to a cellular network, and in particular to a user plane function (UPF). The UPF in turn connects to a Local Area Data Network (LADN). During the operation phase, traffic from the respective UEs is routed from the base station (gNB) towards the UPF (User Plane Function). The UPF is located close to and/or within the Local Area Data Network (LADN). The LADN hosts MEC servers and applications, and computational tasks are performed by these MEC servers and applications within the LADN.

Quality of Service for MEC

In some embodiments, applications executing on a UE such as UE 106 may be sensitive to latency and reliability. For example, Augmented Reality applications may require 20 ms motion-to-photon latency in order not to induce motion sickness (see, e.g., Aykut et. al, Delay Compensation for a Telepresence System With 3D 360 Degree Vision Based on Deep Head Motion Prediction and Dynamic FoV Adaptation, IEEE Robotics and Automation Letters, October 2018). As another example, the user experience while playing a video game may be adversely impacted if the latency rises above a particular threshold. If some of the functions of such applications are offloaded to the cloud or utilize interaction with external services (e.g., face recognition for AR), end-to-end Quality of Service (QoS) provisioning may be desirable to maintain latency requirements. The task of end-to-end QoS mechanisms is to ensure that the network provides adequate latency, reliability and/or throughput QoS for the round trip (i.e., uplink and downlink) connection between the UE and the network, as required by a particular application.

However, for some applications, particularly where computation on remote servers (e.g., edge or cloud servers) is involved, QoS provisioning on the logical link between the UE and the server may be insufficient to ensure end-to-end QoS, since the QoS may be highly dependent on the computational resources. For example, in a 3GPP mobile network, e.g. a 5G NR, the QoS guaranteed by the mobile network only covers the path between the UE and the interface of the user plane function (UPF) towards the external data network (N6 interface). Any additional packet transfer delay between the UPF and a server located in the external data network, as well as computational latency and bottlenecks, are not under the control of the mobile network.

For such applications, it may be desirable to include computational resources when considering QoS for the application. In other words, instead of focusing only on end-to-end QoS, the full QoS loop may be considered of the user-to-server link, the computation on the server, and the server-to-user link. Said another way, end-to-end QoS provisioning typically considers the latency, reliability, and/or throughput of the user-to-server link and the server-to-user link, but does not incorporate the latency, reliability or throughput of the computational resources of the server. To address these and other concerns, embodiments herein present devices and methods for implementing combined network and computation slicing (NCS), which considers the full QoS loop to improve the user experience in MEC applications.

Figure 7:
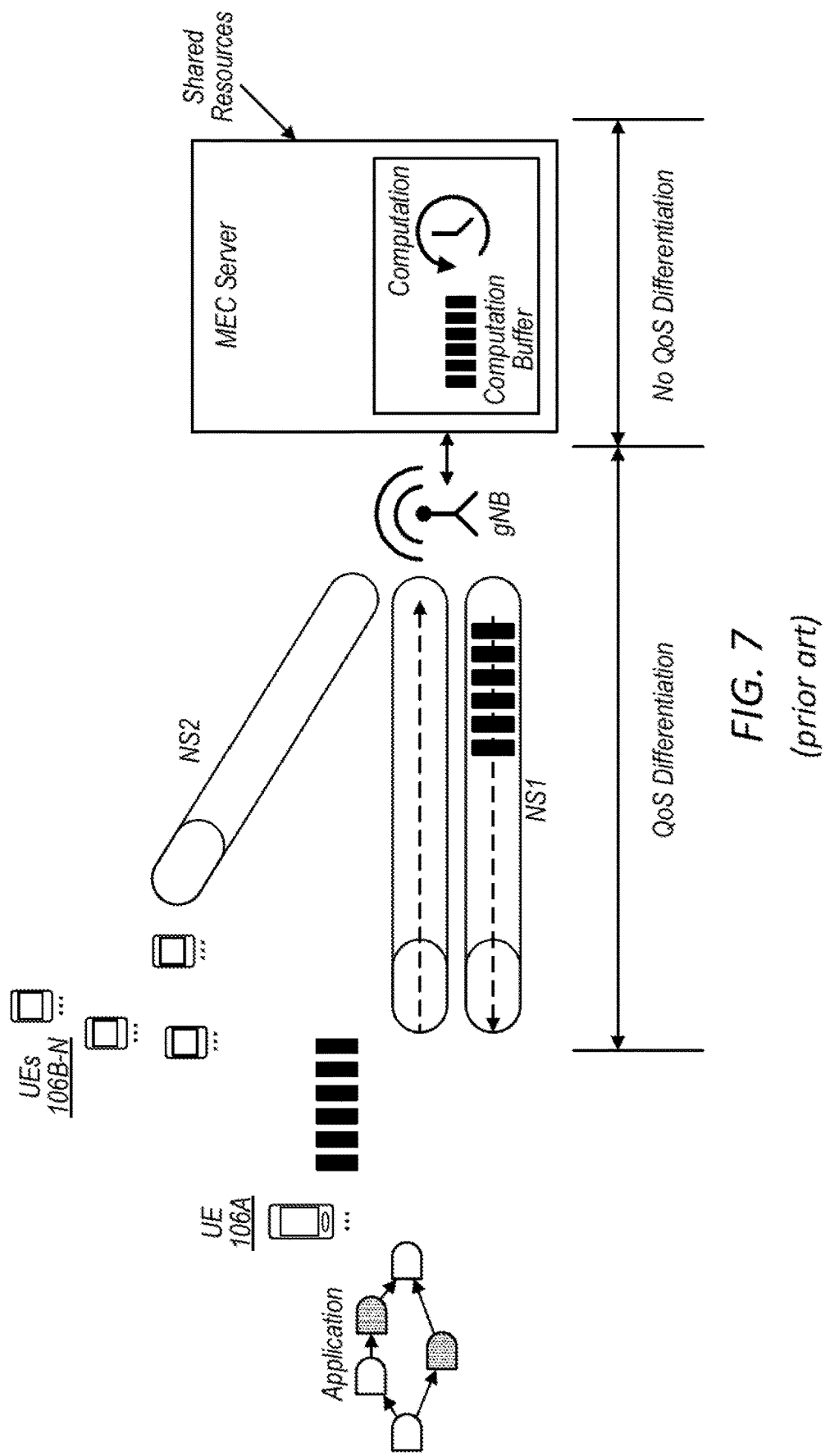
FIG. 7 is a block diagram of a cellular network system network slicing, according to the prior art.

In 5G NR, the concept of network slicing (NS) has been introduced in order allow end-to-end QoS provisioning and enable coexistence of different applications and services with different QoS parameters. NS allows multiple logical networks to be created on top of a common shared physical infrastructure as illustrated in FIG. 7. As illustrated, FIG. 7 shows how slices NS1 and NS2 are (virtually) isolated, and QoS requirements for the connection between the UE 106A and the MEC server may be satisfied.

One way to use NS in 5G is to enforce it for a specific application via User Equipment (UE) Route Selection Policies (URSP). For example, a URSP rule may specify that a given application has to use a particular network slice (e.g., using single network slice selection assistance information, or S-NSSAI).

While NS manages network and radio resources, it may not generalize well to services where computation resources play an important role for application performance. Prominent examples are applications using multi-access edge computing (MEC) to offload tasks/functions, especially in the case where MEC servers are within a 5G Core network (5GC) and operated by network carriers. In these cases, even if NS ensures QoS for the connection between a user and a MEC server, application performance may be degraded due to unexpected waiting times in the computation buffer of a MEC server (e.g., caused by an overload with other tasks arriving at the same time).

Furthermore, from a UE side, it is complex to account for different sources of latency separately (e.g., link, network, computation). Such accounting and associated signaling (e.g., UE-MEC Server signaling) may introduce additional latency for the application. To address these and other concerns, embodiments herein present a common framework for the control of end to end QoS for edge computing applications.

Combined Network and Computation Slices.

Embodiments herein present a jointly combined network and computation slicing (NCS) framework and associated procedures and functions which consist of two main phases, a negotiation phase (referred to herein as NC S-A) and an operation phase (referred to herein as NCS-B).

In some embodiments, in the negotiation phase, a service provider may request MEC server capabilities from available Edge Data Networks (EDNs), pre-select them based on the desired QoS level and expected slice requirements, and send reservation requests for confirmation to create an NCS Instance (NCSI). An Edge Computing Control Function (ECCF) collects and monitors MEC site capabilities and provides this information to a service provider. Based on this information, QoS requirements of the target application and user equipment feedback, the service provider reserves MEC computing resources via the ECCF.

Figure 8:
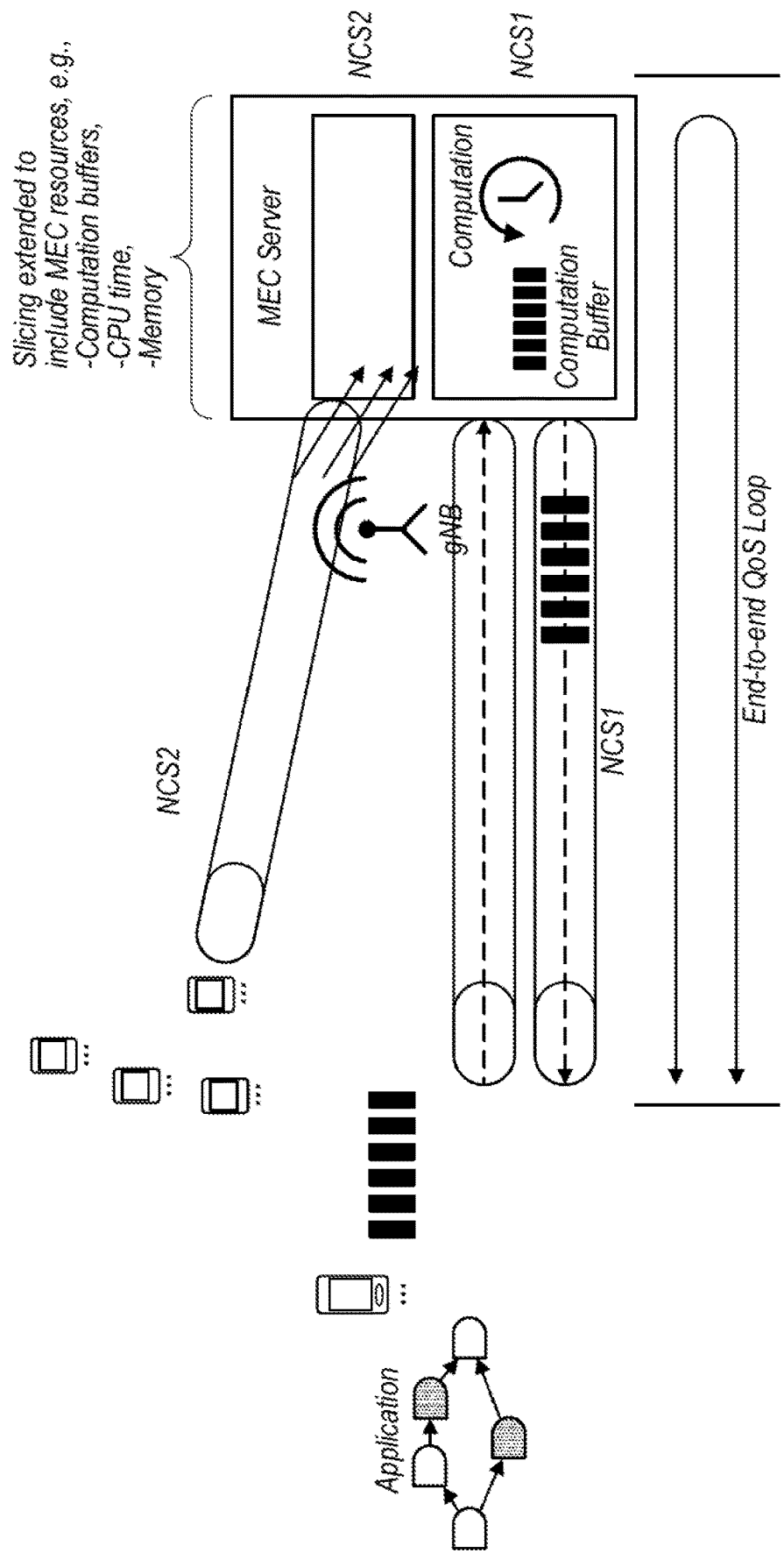
FIG. 8 is a block diagram of a cellular network system implementing combined network and computational slicing (NCS), according to some embodiments.

In some embodiments, in a monitoring phase, the QoS level of individual UEs and/or applications may be monitored and dynamically updated, to improve resource utilization via statistical multiplexing. FIG. 8 is a schematic illustration of NCS, where QoS enforcement is extended to include the full end-to-end loop of the network and the edge computation unit in a single framework. Advantageously, NCS may enable seamless operation of latency-critical edge computing applications. Further, integrating QoS provisioning frameworks for computation and communication may enable dynamic trade-offs and load-balancing between the computation and communication layers, resulting in improved resource utilization and more robust QoS support. For example, a reduced channel quality of an overloaded radio access network (RAN) may be compensated for by increasing computation resources.

In some embodiments, availability of computing resources on the MEC servers may be predetermined for NCS and negotiated between the Service Provider (SP) and the 5G Core Network (5GC), eliminating the need for negotiations between a UE and a MEC server. Advantageously, this may reduce the signaling overhead and latency for critical applications.

NCS-A: NCS Instance Creation

In some embodiments NCSI creation may be initiated by a service provider (SP), or alternatively it may be initiated by a network operation (NO) provisioning system. For example, a computer system (e.g., a server) operated by an SP may be configured to direct NCSI creation. Alternatively, a network element may be included within the core network to direct NCSI creation. For clarity, the entity directing the creation of the NCSI will be referred to herein as an NCSI controller.

The NCSI may include two layers, a communication layer and a computation layer. To establish an NCSI, the NCSI controller may reserve both network and computation layer resources. Reservation of network resources may be implemented according to traditional network slicing protocols.

Reservation of computation resources may include a negotiation phase, where NCSI controller first requests MEC site capabilities from available Edge Data Networks (EDNs), pre-selects them based on the desired QoS level and expected slice requirements, and sends reservation requests for confirmation. An Edge Computing Control Function (ECCF) may be utilized to serve as a proxy for negotiations between the NCSI controller and the MEC servers. The ECCF may collect and monitor MEC server capabilities and provide this information to the NCSI controller. Based on this information as well as the QoS requirements of the target application which will be using NCSI, the NCSI controller may then reserve MEC computing resources via the ECCF.

In some embodiments, MEC server capabilities include dynamic behavior parameters. For example, they may include the time it takes to detect the shortage of computation resources and/or the time it takes to re-adjust or re-negotiate these resources. Since these parameters may introduce additional latency or compromise reliability during operation of the NCSI, in some embodiments they may be considered by the NCSI controller in determining an adjusted QoS level when pre-selecting MEC computational resources.

In some embodiments, computing resources are reserved in a physical form, i.e., a dedicated physical computing unit of one or more MEC servers may be allocated for computing resources. Alternatively, in some embodiments computing resources are represented and reserved in a virtualized form on a single MEC server or across different MEC servers and/or EDNs. Advantageously, virtual computing resource allocation may enable transparent task offloading from one user to many servers.

In some embodiments, a resource reservation request from the NCSI controller to the ECCF may include a priority level of an application which will utilize the NCSI. The priority level, similar to an Allocation and Retention Priority (ARP) parameter in a 5G QoS architecture, may determine the priority of the incoming request. For example, an NCSI for a life-critical application (e.g., health, security) may be prioritized over an NCSI for user leisure applications (e.g., shopping, gaming), meaning that the resources reserved for non-prioritized applications may be released in favor of prioritized applications.

After the NCSI has completed negotiations for computational resources with the ECCF and negotiations for network slices with the core network, the NCSI may be registered with the 5GC (e.g., via a network slice selection function (NSSF)), and eligible users may be allowed to establish PDU sessions within the NCSI.

NCSI creation is further described in greater detail below in reference to FIG. 9.

Figure 9:
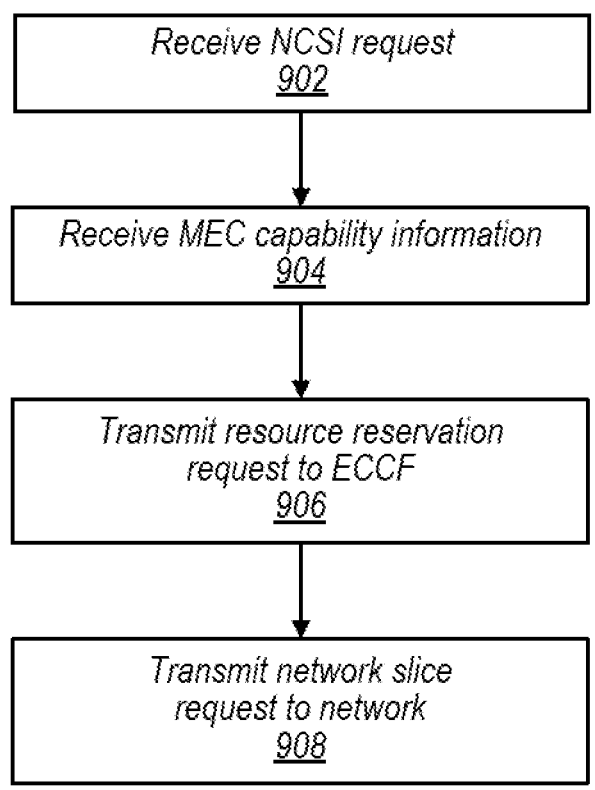
FIG. 9 is a flow diagram illustrating creation of an NCS instance (NCSI), according to some embodiments.

FIG. 9—Flowchart for Creating an NCSI

FIG. 9 is a flowchart diagram illustrating an exemplary method for an NCSI controller to create an NCSI. The method shown in FIG. 9 may be used in conjunction with any of the computer systems or devices shown in the above Figures, among other devices. As one possibility, the method of FIG. 9 may be implemented by a network element (NE) or a computer system (CS) 500 such as that illustrated in and described with respect to FIGS. 1 and 5. The NE/CS may function as an NCSI controller. The NE/CS may be a network service provider, or it may be a network operation provisioning system, among other possibilities. The NE/CS may include a non-transitory computer-readable memory medium, and a processor operably coupled to the memory medium, among other components. In various embodiments, some of the elements of the method shown may be performed concurrently, in a different order than shown, or may be omitted. Additional elements may also be performed as desired. As shown, the method may operate as follows.

At 902, a network and computation slice instance (NCSI) request is received to establish a NCSI for one or more user equipment devices (UEs). The NCSI may include a reservation of a first network slice and a reservation of a first set of Multi-access Edge Computing (MEC) computational resources. As described in greater detail below, the NCSI controller may be configured to reserve communication resources (e.g., the first network slice) and computational resources (e.g., the first set of MEC computational resources) for the NCSI.

The NCSI request may include a quality of service (QoS) requirement for the NCSI. The QoS requirement may include one or more key performance indicators (KPIs) for the entire end-to-end communication loop of the NCSI, and may consider both the network communication layer as well as the MEC computational layer of the NCSI. In other words, the QoS requirement may specify a degree of overall latency, reliability, and/or throughput required for the NCSI that includes contributions to latency, reliability, and/or throughput from both the communication layer (e.g., latency introduced through communicating over the 3GPP network) and the computational layer (e.g., computational latency incurred at the MEC server(s)).

The NCSI request may include a priority level of one or more target applications of the one or more UEs for the NCSI. The first set of MEC computational resources may be selected based at least in part on the priority level and the resource reservation request may include the priority level. For example, as described in greater detail above, a high priority application such as a health monitoring application may be tagged as high priority in the NCSI request, and the NCSI controller may consider the priority of the application when selecting the MEC computational resources to reserve for the NCSI.

At 904, MEC capability information of one or more MEC servers is received. The MEC capability information may include a variety of types of information related to capabilities of the one or more MEC servers that are available to service the NCSI, in various embodiments. For example, the MEC capability information may specify computational capabilities (e.g., available memory, storage, and/or CPU/GPU resources) and/or communication capabilities (e.g., average and/or maximum latency for communications with gNBs and/or the network, bandwidth and/or interface limitations, etc.) of the one or more MEC servers.

In some embodiments, the MEC capability information may include an MEC latency capability, where the MEC latency capability specifies a latency for detecting a shortage of MEC computational resources of the one or more MEC servers and/or a latency for adjusting the MEC computational resources of the one or more MEC servers. In these embodiments, the NCSI controller may be further configured to adjust the QoS requirement based on the MEC latency capability to obtain an adjusted QoS requirement, where the first set of MEC computational resources is selected based at least in part on the adjusted QoS requirement. In other words, the MEC controller may adjust the QoS requirement to account for additional latencies of the MEC servers specified in the MEC capability information.

At 906, a resource reservation request is transmitted to an Edge Computing Control Function (ECCF) to reserve the first set of MEC computational resources for the NCSI. The first set of MEC computational resources may be selected based at least in part on the MEC capability information and the QoS requirement. For example, the first set of MEC computational resources may be selected within the constraints of the MEC capability information to satisfy the QoS requirement (or the adjusted QoS requirement). The first set of MEC computational resources may include one or more physical computational resources of one or more MEC servers, or alternatively, the first set of MEC computational resources may include virtualized computational resources of one or more MEC servers.

At 908, a network slice request is transmitted to a network to reserve the first network slice for the NCSI. The first network slice may be selected based at least in part on the QoS requirement. The first set of MEC computational resources and the first network slice may be selected based at least in part on the MEC capability information and the QoS requirement such that a combined operational latency, reliability, and/or throughput associated with the first set of MEC computational resources and the first network slice does not exceed a latency, reliability, and/or throughput requirement, respectively, of the QoS requirement. The computer system may then register the NCSI with a core network, and one or more UEs may operate within the NCSI by utilizing the first network slice and the first set of MEC computational resources. In some embodiments, the NCSI may operate according to the method described below in regard to NCS-B and FIG. 11.

NCS-B—NCSI Operation and Dynamic Updates

Figure 10:
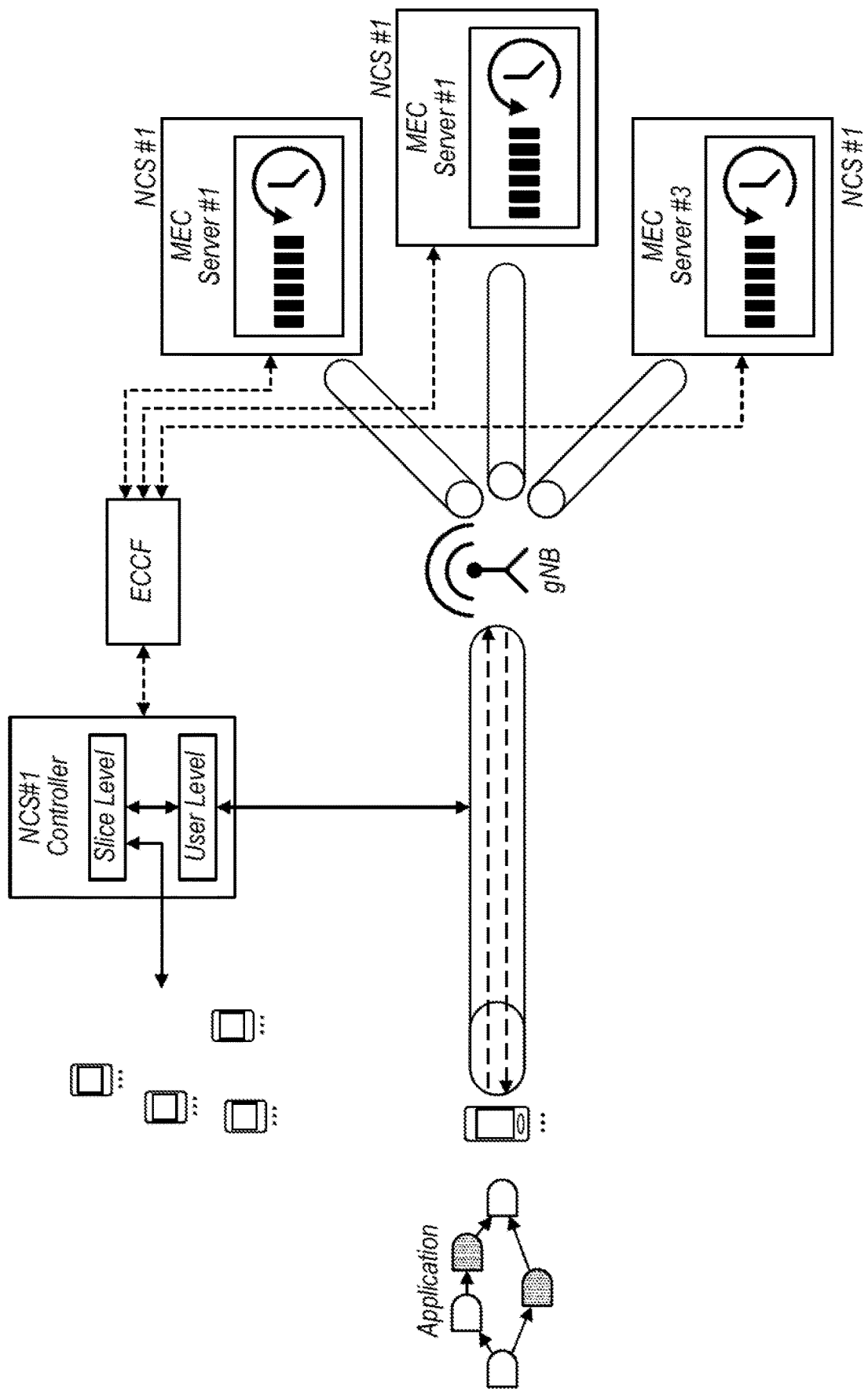
FIG. 10 is a block diagram of a cellular network system implementing combined NCS with slice and user level monitoring, according to some embodiments.

In some embodiments, dynamic updates may be employed to enhance performance for NCSI operation. As illustrated in FIG. 10, the NCSI controller may monitor the current status of the NCSI on both a slice level and on a user level during the operation phase of the NCSI. Slice level monitoring may be used to keep track of the aggregated load of the NCSI, and may monitor one or more of the number of UEs currently utilizing the NCSI, the activity patterns of these UEs, and the number of active application sessions of the NCSI. User level monitoring may keep track of the QoS of data traffic and/or QoS requirements of individual UEs and/or applications. The NCSI may utilize information obtained from monitoring the NCSI to arbitrate resource allocation between UEs active within the NCSI, to improve accommodation of QoS requirements of the UEs. User level and slice level monitoring functions may interact to provide better resource utilization via statistical multiplexing.

In some embodiments, a UE operating within the NCSI may provide feedback to the NCSI controller. For example, changing QoS requirements and changing user behavior fed back from the UE may be used to update resource allocations for the UE within the NCSI. As one example, if the scenery in a virtual reality (VR) game application is becoming less complex, or the number of users of an active application is reduced, a portion of the computational and/or communication resources reserved for the UE within the NCSI application may be released.

In some embodiments, the NCSI controller may react to the information received from slice and user level monitoring by renegotiating computation and/or communication resources with the ECCF and/or the 5GC. In some embodiments, the NCSI controller may determine that radio latency of the NCSI has increased based on the monitoring information. For example, high radio latency may result due to transmission errors and/or a prevalence of hybrid automatic repeat requests (HARM) in poor radio conditions. Additionally or alternatively, high radio latency may result from throughput changes resulting from link adaptation over varying radio channel conditions, among other possibilities. The NCSI may compensate for the increase in radio latency by moving computation to a more powerful MEC server and/or by reserving more MEC server computational resources.

In some embodiments, based on monitoring operational parameters of the NCSI, the NCSI may release one or more MEC computational resources if channel quality conditions improve. For example, the signal quality of an active network slice of the NCSI may improve, or a low-latency RAN link may become available, resulting in an increase in the QoS of available communication resources. During operation of the NCSI, a network slice with a light traffic load may become available for reservation by the NCSI, or an URLLC network slice may become available, and the NCSI controller may reserve these or other types of low-latency network slices and concurrently release one or more MEC computational resources. Accordingly, the QoS of data traffic of the UEs operating within the NCSI may be maintained within their respective QoS requirements, while the released MEC computational resources may be reallocated for other uses.

In some embodiments, a UE engaged in an NCSI may exhibit mobility and may perform an MEC handover to a new set of MEC resources (e.g., by moving from one service area to another service area). In these embodiments, the new set of MEC resources may be insufficient to provide the required latency of the application executing on the UE, in which case the NCSI controller may release one or both of a network slice and at least a portion of the MEC computational resources reserved for the UE, to free up these resources for other uses.

In some embodiments, the monitoring function of the NCSI controller determines that the desired QoS requirements for a particular UE/application can no longer be guaranteed (e.g., because of degradation in radio conditions, computational or communication congestion, increased aggregate load, etc.). In these embodiments, if the application in question is indicated as having flexible QoS requirements, the NCSI controller may configure communication and/or computational resources for the NCSI with slightly reduced QoS capabilities (i.e., soft degradation). This may be used to avoid immediate service termination at the cost of a slightly degraded user experience, for applications with soft (i.e., flexible) QoS requirements. For example, QoS requirements for a particular UE and/or for a particular application may be alternatively expressed as either hard requirements (e.g., strict latency and/or reliability targets) or soft requirements (e.g., average latency and/or reliability targets).

In some embodiments, out-of-service or radio link failures may trigger release of MEC computational resources. In some embodiments, if the slice level monitoring function anticipates or detects a communication or computational resource shortage (e.g., because of increased throughput on the NCSI), the NCSI controller may implement traffic shaping or access control, restricting access to new users or limiting application activity.

Dynamic NCSI operation is further described in greater detail below in reference to FIG. 11.

Figure 11:
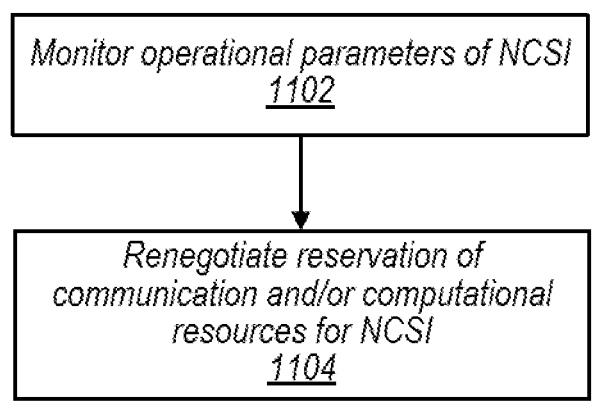
FIG. 11 is a flow diagram illustrating operation of an NCSI, according to some embodiments.

FIG. 11—Flowchart for Operating an NCSI

FIG. 11 is a flowchart diagram illustrating an exemplary method for an NCSI controller to dynamically operate an NCSI. The NCSI may be created by a NCSI controller using a variety of means, including but not limited to the methods described above in reference to NCS-A and FIG. 9. The NCSI may include a reservation of a first network slice and a reservation of a first set of Multi-access Edge Computing (MEC) computational resources. The method shown in FIG. 11 may be used in conjunction with any of the computer systems or devices shown in the above Figures, among other devices. As one possibility, the method of FIG. 11 may be implemented by a network element (NE) or a computer system (CS) 500 such as that illustrated in and described with respect to FIGS. 1 and 5. The NE/CS may function as an NCSI controller. The NE/CS may be a network service provider, or it may be a network operation provisioning system, among other possibilities. The NE/CS may include a non-transitory computer-readable memory medium, and a processor operably coupled to the memory medium, among other components. In various embodiments, some of the elements of the method shown may be performed concurrently, in a different order than shown, or may be omitted. Additional elements may also be performed as desired. As shown, the method may operate as follows.

At 1102, one or more operational parameters of the NCSI are monitored, where the one or more operational parameters of the NCSI include one or more of an aggregate load of the NCSI, a quality of service (QoS) of data traffic for one or more user equipment devices (UEs) operating within the NCSI, and a QoS requirement for each of the one or more UEs operating within the NCSI. The aggregate load of the NCSI may include one or both of an aggregate network load on network resources available for the NCSI (e.g., an aggregate load on the first network slice) and/or an aggregate computational load on one or more MEC servers servicing the NCSI (e.g., an aggregate load on the first set of MEC computational resources). Monitoring the QoS of data traffic may include monitoring, in real time, the QoS actually experienced for data traffic by the one or more UEs operating within the NCSI. Monitoring the QoS requirements of the one or more UEs operating within the NCSI may include monitoring to see if the QoS requirements of particular UEs are modified during operation of the NCSI. For example, the QoS requirements of a particular active application may be dynamically modified during operation of the application (e.g., the throughput requirements of a video/audio chat application may be modified if a user temporarily deactivates his/her camera during the chat, among other possibilities).

In some embodiments, the one or more operational parameters may further include a signal quality of communications over the NCSI. The NCSI controller may determine, based on monitoring the one or more operational parameters, that the signal quality of communications over the NCSI has degraded. The NCSI may then request reservation of a second set of MEC computational resources from an Edge Computing Control Function (ECCF) based at least in part on determining that the signal quality of communications over the NCSI has degraded. Advantageously, the second set of MEC resources may increase the QoS of the computational layer, to compensate for a decreased QoS within the communication layer and maintain a satisfactory overall QoS. Alternatively, the NCSI controller may determine, based on monitoring the one or more operational parameters, that the signal quality of communications over the NCSI has improved. In these embodiments, the NCSI controller may release at least a subset of the first set of MEC computational resources based at least in part on determining that the signal quality of communications over the NCSI has improved. In these embodiments, the improved signal quality may increase the QoS within the communication layer, thereby allowing the overall QoS requirements of the NCSI to be satisfied with a smaller subset of MEC computational resources. The subset of the first set of MEC computational may then be released to be utilized for other applications (e.g., for another NCSI.

Alternatively or additionally, in some embodiments improved radio conditions may cause an application that is using the NCSI to increase its utilization of computational resources. For example, a UE executing an image rendering and object classification application may initially outsource the object classification task to the MEC servers. In poor radio conditions, the UE may perform the image rendering processes locally, to avoid transmitting large throughput image files through poor radio conditions. However, if radio conditions improve, the UE may elect to outsource the image rendering as well as the object classification tasks to the MEC servers. Accordingly, improved radio conditions may result in an increase of the MEC computational resources reserved for the NCSI. Conversely, degraded radio conditions may result in a decrease in the MEC computational resources reserved for the NCSI, as additional computational tasks are moved from the MEC servers to the served UE(s).

At 1104, one or both of the reservation of the first network slice and the reservation of the first set of MEC computational resources are renegotiated based at least in part on monitoring the one or more operational parameters. Renegotiating one or both of the reservation of the first network slice and the reservation of the first set of MEC computational resources may include one or more of requesting reservation of additional resources for the first network slice, requesting reservation of a second network slice for the NCSI from a core network, requesting reservation of a second set of MEC computational resources for the NCSI from an Edge Computing Control Function (ECCF), requesting reservation of additional computational resources for the first set of MEC computational resources for the NCSI from the ECCF, communicating with a core network to release the first network slice or a portion of the resources of the first network slice from the NCSI, or communicating with an Edge Computing Control Function (ECCF) to release at least a subset of the first set of MEC computational resources.

In some embodiments, the NCSI controller may determine that the aggregate load of the NCSI has decreased based at least in part on monitoring the one or more operational parameters of the NCSI. Alternatively or additionally, the NCSI controller may determine that the QoS requirements have become less stringent for one or more of the UEs operating within the NCSI based at least in part on monitoring the one or more operational parameters of the NCSI. In response to either of these determinations, the NCSI may release at least a subset of the first network slice or the first set of MEC computational resources.

In some embodiments, the NCSI controller may determine that the aggregate load of the NCSI has increased, that the QoS requirements have become more stringent for one or more of the UEs operating within the NCSI, and/or that the QoS of data traffic for a first UE of the one or more UEs operating within the NCSI does not satisfy the QoS requirements of the first UE. These determinations may be made based at least in part on monitoring the one or more operational parameters of the NCSI. In response to one or more of these determinations, the NCSI may reserve of one or more of additional resources for the first network slice, a second network slice, and/or a second set of MEC computational resources for the NCSI.

In some embodiments, based on monitoring the one or more operational parameters, the NCSI controller may determine that one or more of the UEs operating within the NCSI has gone out-of-service (OOS) or has experienced a radio link failure (RLF). In these embodiments, based at least in part on determining that one or more of the UEs operating within the NCSI has gone OOS or has experienced the RLF, the NCSI controller may release at least a subset of the first set of MEC computational resources.

In some embodiments, the NCSI controller may determine that a second network slice has become available, where the second network slice exhibits a lower latency QoS than the first network slice. In these embodiments, based at least in part on determining that the second network slice has become available, the NCSI controller may reserve the second network slice for the NCSI and release at least a subset of the first set of MEC computational resources.

In some embodiments, it may be determined that a first UE of the one or more of the UEs operating within the NCSI has performed a handover procedure, where after performing the handover procedure the first UE has access to a second set of MEC computational resources that do not satisfy the QoS requirements of the first UE. In these embodiments, based on determining that the first UE has performed the handover procedure and is no longer able to satisfy its QoS requirements, the NCSI controller may release the first network slice from the NCSI.

Implementation Example

The following paragraphs describe a particular implementation example of embodiments described herein. Consider an augmented reality (AR) application, where objects in an image are recognized and labeled. The object recognition task may be offloaded to an MEC service. To ensure a satisfactory user experience, the latency L between taking an image and displaying the image with object labels (i.e., response time) should be below a particular threshold value. The AR application is assigned an identifier "App1". In this example, there may be a large number of UEs executing applications in the network, and there is a particular service provider (SP) functioning as an NCSI controller for the AR application and the other applications. The SP uses NCS to ensure that the latency requirements are satisfied for all users.

In order to create an NCSI for the AR application, the SP communicates with a 5GC (either directly or via an application function). Creation and operation of an NCSI may be implemented as a special type of a network slice lifecycle management procedure as suggested by 3GPP in TR 28.801, where NCS-A as described above corresponds to Instantiation, Configuration and Activation phase procedures and NCS-B corresponds to Run Time phase procedures. An NCSI may be instantiated from a predefined Network Slice Template. NCS can be also integrated into the 3GPP framework as a special Slice/Service Type (SST).

In this example, the amount of computational and communication resources to be reserved for the NCSI may depend on the estimated parameters of the NCSI, such as the number of users, their expected activity patterns, and their QoS requirements. As one example, suppose that the latency requirement time for App1 is 100 ms, and a packet loss rate of $10^{-4}$ may be tolerated by App1 due to redundant encoding of images. Let us further assume that from the communication side, the NCSI can provide 30 ms latency with a packet loss rate of $10^{-4}$ (for example, by the means of delay critical GBR 5QI #84 [3GPP TS 23.501]). In this example, MEC computational resources may be reserved in a way that queuing delay and CPU/GPU processing time on the server of an image is kept below 70 ms, such that the total latency (e.g., 30 ms+70 ms) is kept below the latency requirement of 100 ms.

In this example, suppose that computation resources are reserved in the edge network "$DNN_1$". After the resources are reserved, an NCSI may be established (with an exemplary identified "NCS #1") and registered with a NSSF, so that UEs can use the slice. The UEs may use the NCSI for one or more applications by the means of an (exemplary) UE route selection policy (URSP) rule such as that shown in Table 1 below.

TABLE 1

| Rule Example | | |
| --- | --- | --- |
| Rule example | | Comment |
| Rule Precedence = 1 Traffic Descriptor: Application | Route Selection Descriptor Precedence = 1 | This URSP rule associates the traffic of application "App1" with NCS #1, |

TABLE 1-continued

| Rule Example | | |
| --- | --- | --- |
| Rule example | | Comment |
| Identifiers = App1 | Network Slice Selection: NCS #1 DNN Selection: $DNN_1$ Access Type preference: 3GPP access | 3GPP access and the edge data network $DNN_1$. It enforces the following routing policy: The traffic of App1 should be transferred on a PDU session supporting NCS #1 and DNN = DNN_1 over 3GPP access. If this PDU session is not established, the UE shall attempt to establish such PDU session |

In this example, if the computational load on the MEC server(s) increases, the NCSI may not be able to maintain the target delay of 70 ms, and the MEC server(s) may indicate this information to the NCSI controller via the ECCF. The NCSI controller may then react to this information by decreasing delay on the communication side (e.g., in the radio access network (RAN)) by establishing a 5QI #84 bearer with a 10 ms latency budget instead of the 30 ms latency budget, as one example.

In some embodiments, if the number of users in an NCSI increases above a particular threshold, or if the activity of users is higher than anticipated, the NCSI may renegotiate an increase in CPU/GPU time on the server and/or increase the amount of reserved CPU/GPU cores at the MEC servers.

FIGS. 12-14—Modifications to 3GPP to Support Network and Computation Slicing

In some embodiments, NCS may be implemented using 3GPP proposed architectures for edge computing, such as TS 23.558. To enable NCS, and in particular to enable the NC S-A procedure of slice instance creation, Common Information Elements may be added in TS 23.558, Section 8 as shown in FIGS. 12-14.

The embodiments described herein may become standardized, i.e., may become part of cellular specifications followed by most or all in the cellular industry. Alternatively, the embodiments described herein may be used as a proprietary solution by a single manufacturer, such as a UE manufactured by company A communicating directly with a MEC server that may also be owned or operated by company A. Thus the embodiments described herein, such as the NCSI Controller, do not require standardization.

Additional Embodiments

The following numbered paragraphs describe additional embodiments.

In some embodiments, a computer system comprises a non-transitory computer-readable memory medium and a processor coupled to the memory medium. The computer system is configured to receive a network and computation slice instance (NCSI) request to establish a NCSI for one or more user equipment devices (UEs). The NCSI includes a reservation of a first network slice and a reservation of a first set of Multi-access Edge Computing (MEC) resources. The NCSI request includes a quality of service (QoS) requirement for the NCSI.

The computer system is further configured to receive MEC capability information of one or more MEC servers, transmit a resource reservation request to an Edge Computing Control Function (ECCF) to reserve the first set of MEC computational resources for the NCSI, and transmit a network slice request to a network to reserve the first network slice for the NCSI.

In some embodiments, the first set of MEC computational resources is selected based at least in part on the MEC capability information and the QoS requirement.

In some embodiments, the first network slice is selected based at least in part on the QoS requirement.

In some embodiments, the first set of MEC computational resources and the first network slice are selected based at least in part on the MEC capability information and the QoS requirement such that a combined operational latency or reliability associated with the first set of MEC computational resources and the first network slice does not exceed a latency or reliability requirement of the QoS requirement.

In some embodiments, the NCSI request includes a priority level of a target application of the UE for the NCSI, the first set of MEC computational resources is selected based at least in part on the priority level, and the resource reservation request includes the priority level.

In some embodiments, the first set of MEC computational resources includes one or more physical computational resources of one or more MEC servers.

In some embodiments, the first set of MEC computational resources includes virtualized computational resources of one or more MEC servers.

In some embodiments, the computer system is a network service provider or a network operation provisioning system.

In some embodiments, the MEC capability information includes an MEC latency capability. In various embodiments, the MEC latency capability includes one or more of a latency for detecting a shortage of MEC computational resources of the one or more MEC servers and/or a latency for adjusting the MEC computational resources of the one or more MEC servers. In these embodiments, the computer system may be further configured to adjust the QoS requirement based on the MEC latency capability to obtain an adjusted QoS requirement, where the first set of MEC computational resources is selected based at least in part on the adjusted QoS requirement.

In some embodiments, the computer system is further configured to register the NCSI with a core network.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a network element, by interpreting each message/signal X received by the UE in the downlink as a message/signal X transmitted by the network element, and each message/signal Y transmitted in the uplink by the UE as a message/signal Y received by the network element, according to various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for operating a network and computation slice instance (NCSI), the method comprising:
monitoring one or more operational parameters of the NCSI, wherein the NCSI comprises a reservation of a first network slice and a reservation of a first set of physical Multi-access Edge Computing (MEC) computational resources, wherein the one or more operational parameters of the NCSI include one or more of:
a quality of service (QoS) of data traffic for one or more user equipment devices (UEs) operating within the NCSI; and
one or more respective QoS requirements for each of the one or more UEs operating within the NCSI; and
renegotiating one or both of the reservation of the first network slice and the reservation of the first set of physical MEC computational resources based at least in part on monitoring the one or more operational parameters,
wherein the first set of physical MEC computational resources and the first network slice are selected based at least in part on MEC capability information and the one or more QoS requirements such that a combined operational latency associated with the first set of physical MEC computational resources and the first network slice does not exceed a latency requirement of the one or more QoS requirements.

2. The method of claim 1,
wherein renegotiating one or both of the reservation of the first network slice and the reservation of the first set of physical MEC computational resources includes requesting reservation of additional network resources for the first network slice for the NCSI from a core network.

3. The method of claim 2,
wherein renegotiating one or both of the reservation of the first network slice and the reservation of the first set of physical MEC computational resources includes one or more of:
  requesting reservation of a second network slice for the NCSI from the core network; and
  requesting reservation of a second set of physical MEC computational resources for the NCSI from an Edge Computing Control Function (ECCF).

4. The method of claim 1,
wherein the one or more operational parameters of the NCSI further include an aggregate load of the NCSI.

5. The method of claim 1,
wherein renegotiating one or both of the reservation of the first network slice and the reservation of the first set of physical MEC computational resources includes one or more of:
  communicating with a core network to release the first network slice from the NCSI; and
  communicating with an Edge Computing Control Function (ECCF) to release at least a subset of the first set of physical MEC computational resources.

6. The method of claim 1, further comprising:
based at least in part on monitoring the one or more operational parameters of the NCSI, determining that the QoS requirements have become less stringent for one or more of the UEs operating within the NCSI,
wherein renegotiating one or both of the reservation of the first network slice and the reservation of the first set of physical MEC computational resources comprises releasing at least a subset of the first network slice or the first set of physical MEC computational resources.

7. The method of claim 1, further comprising:
based at least in part on monitoring the one or more operational parameters of the NCSI, determining that the QoS requirements have become more stringent for one or more of the UEs operating within the NCSI,
wherein renegotiating one or both of the reservation of the first network slice and the reservation of the first set of physical MEC computational resources comprises requesting reservation of one or more of:
  additional network resources for the first network slice for the NCSI;
  a second network slice for the NCSI;
  additional computational resources for the first set of physical MEC computational resources for the NCSI; and
  a second set of physical MEC computational resources for the NCSI.

8. The method of claim 1, further comprising:
based on monitoring the one or more operational parameters, determining that the QoS of data traffic for a first UE of the one or more UEs operating within the NCSI does not satisfy the QoS requirements of the first UE,
wherein renegotiating one or both of the reservation of the first network slice and the reservation of the first set of physical MEC computational resources comprises requesting reservation of one or more of additional network resources for the first network slice for the NCSI, a second network slice, and a second set of physical MEC computational resources for the NCSI based at least in part on determining that the QoS of data traffic for the first UE does not satisfy the QoS requirements of the first UE.

9. The method of claim 1,
wherein the one or more operational parameters further comprise a signal quality of communications over the NCSI, wherein the method further comprises:
determining, based on monitoring the one or more operational parameters, that the signal quality of communications over the NCSI has degraded; and
requesting reservation of a second set of physical MEC computational resources from an Edge Computing Control Function (ECCF) based at least in part on determining that the signal quality of communications over the NCSI has degraded.

10. The method of claim 1,
wherein the one or more operational parameters further comprise a signal quality of communications over the NCSI, wherein the method further comprises:
determining, based on monitoring the one or more operational parameters, that the signal quality of communications over the NCSI has improved; and
releasing at least a subset of the first set of physical MEC computational resources based at least in part on determining that the signal quality of communications over the NCSI has improved.

11. The method of claim 1,
wherein the one or more operational parameters further comprise a signal quality of communications over the NCSI, wherein the method further comprises:
determining, based on monitoring the one or more operational parameters, that the signal quality of communications over the NCSI has degraded; and
releasing at least a subset of the first set of physical MEC computational resources based at least in part on determining that the signal quality of communications over the NCSI has degraded.

12. The method of claim 1,
wherein the one or more operational parameters further comprise a signal quality of communications over the NCSI, wherein the method further comprises:
determining, based on monitoring the one or more operational parameters, that the signal quality of communications over the NCSI has improved; and
requesting reservation of a second set of physical MEC computational resources from an Edge Computing Control Function (ECCF) based at least in part on determining that the signal quality of communications over the NCSI has improved.

13. The method of claim 1, further comprising:
determining, based on monitoring the one or more operational parameters, that one or more of the UEs operating within the NCSI has gone out-of-service (OOS) or has experienced a radio link failure (RLF); and
based at least in part on determining that one or more of the UEs operating within the NCSI has gone OOS or has experienced the RLF, releasing at least a subset of the first set of physical MEC computational resources.

14. The method of claim 1, further comprising:
determining that a second network slice has become available, wherein the second network slice exhibits a lower latency QoS than the first network slice;
based at least in part on determining that the second network slice has become available, reserving the second network slice for the NCSI and releasing at least a subset of the first set of physical MEC computational resources.

15. The method of claim 1, further comprising:
determining that a first UE of the one or more of the UEs operating within the NCSI has performed a handover procedure, wherein after performing the handover procedure the first UE has access to a second set of physical MEC computational resources that do not satisfy the QoS requirements of the first UE; and based on determining that the first UE has performed the handover procedure, releasing the first network slice from the NCSI.

16. A network element, comprising:

a non-transitory computer-readable memory medium; and a processor coupled to the memory medium, wherein the processor is configured to cause the network element to:

monitor one or more operational parameters of a network and computation slice instance (NCSI), wherein the NCSI comprises a reservation of a first network slice and a reservation of a first set of physical Multi-access Edge Computing (MEC) computational resources, wherein the one or more operational parameters of the NCSI include one or more of:

a quality of service (QoS) of data traffic for one or more user equipment devices (UEs) operating within the NCSI; and one or more respective QoS requirements for each of the one or more UEs operating within the NCSI; and renegotiate one or both of the reservation of the first network slice and the reservation of the first set of physical MEC computational resources based at least in part on monitoring the one or more operational parameters, wherein the first set of physical MEC computational resources and the first network slice are selected based at least in part on MEC capability information and the one or more QoS requirements such that a combined operational latency associated with the first set of physical MEC computational resources and the first network slice does not exceed a latency requirement of the one or more QoS requirements.

17. The network element of claim 16, wherein renegotiating one or both of the reservation of the first network slice and the reservation of the first set of physical MEC computational resources includes requesting reservation of additional network resources for the first network slice for the NCSI from a core network.

18. The network element of claim 17, wherein renegotiating one or both of the reservation of the first network slice and the reservation of the first set of physical MEC computational resources includes one or more of:

requesting reservation of a second network slice for the NCSI from the core network; and requesting reservation of a second set of physical MEC computational resources for the NCSI from an Edge Computing Control Function (ECCF).

19. An apparatus comprising a processor configured to execute program instructions to cause a computer system to:

monitor one or more operational parameters of a network and computation slice instance (NCSI), wherein the NCSI comprises a reservation of a first network slice and a reservation of a first set of physical Multi-access Edge Computing (MEC) computational resources, wherein the one or more operational parameters of the NCSI include one or more of:

a quality of service (QoS) of data traffic for one or more user equipment devices (UEs) operating within the NCSI; and one or more respective QoS requirements for each of the one or more UEs operating within the NCSI; and renegotiate one or both of the reservation of the first network slice and the reservation of the first set of physical MEC computational resources based at least in part on monitoring the one or more operational parameters, wherein the first set of physical MEC computational resources and the first network slice are selected based at least in part on MEC capability information and the one or more QoS requirements such that a combined operational latency associated with the first set of physical MEC computational resources and the first network slice does not exceed a latency requirement of the one or more QoS requirements.

20. The apparatus of claim 19, wherein renegotiating one or both of the reservation of the first network slice and the reservation of the first set of physical MEC computational resources includes requesting reservation of additional network resources for the first network slice for the NCSI from a core network.

\* \* \* \* \*